United States Patent
Spindler et al.

(10) Patent No.: US 8,241,389 B2
(45) Date of Patent: Aug. 14, 2012

(54) METHOD AND DEVICE FOR PRODUCING NITROGEN FERTILIZER, REMOVING PHOSPHATE FROM ORGANIC WASTE PRODUCTS, AND LIMITING THE POTASSIUM CONCENTRATION

(75) Inventors: Herbert Spindler, Halle (DE); Ute Bauermeister, Leipzig (DE); Thomas Meier, Berlin (DE)

(73) Assignee: Phoenix Beteilgungs GmbH, Schwarzach (AT)

( * ) Notice: Subject to any disclaimer, the term of this patent is extended or adjusted under 35 U.S.C. 154(b) by 878 days.

(21) Appl. No.: 11/887,341

(22) PCT Filed: Mar. 21, 2006

(86) PCT No.: PCT/EP2006/002744
§ 371 (c)(1),
(2), (4) Date: Oct. 22, 2008

(87) PCT Pub. No.: WO2006/105875
PCT Pub. Date: Oct. 12, 2006

(65) Prior Publication Data
US 2009/0078013 A1    Mar. 26, 2009

(30) Foreign Application Priority Data
Apr. 8, 2005   (DE) .......................... 10 2005 017 077

(51) Int. Cl.
*C05C 11/00* (2006.01)
(52) U.S. Cl. ............. 71/54; 71/12; 71/21; 71/33; 71/34; 71/61
(58) Field of Classification Search ................ 71/11–26, 71/33, 34, 54, 61; 422/168–187
See application file for complete search history.

(56) References Cited

U.S. PATENT DOCUMENTS
4,137,158 A    1/1979   Ishida et al.
(Continued)

FOREIGN PATENT DOCUMENTS
DE          41 31 296        3/1993
(Continued)

OTHER PUBLICATIONS
WO 2005/049495 published on Jun. 2, 2005.*
(Continued)

*Primary Examiner* — Wayne Langel
(74) *Attorney, Agent, or Firm* — Husch Blackwell LLP

(57) ABSTRACT

The invention relates to a method and a device for producing nitrogen fertilizer, removing phosphate from organic waste products in liquid phase, sanitizing said waste or reducing emissions, and limiting the potassium concentration. According to the invention, the waste product is heated to temperatures ranging between 40 DEG C. at a subatmospheric pressure, the escaping gas that contains carbon dioxide and ammonia is contacted with a mineral-aqueous suspension, the excess gas is conducted within the circuit while the subatmospheric pressure is autogenously stabilized, and the formed nitrogen fertilizer is discharged. In order to additionally produce phosphate fertilizer and limit the potassium concentration, the obtained fertilizer product is divided into the liquid and solid portion, and all or some of the solid portion is redirected into the stripping receptacle while the liquid waste product that is stripped of nitrogen and compounds and phosphorus compounds is cooled and mixed with at least one sulfate-containing compound to limit the small amount of a basic mineral powder is added thereto. The last solid portion obtained from said treatment can be used directly as phosphate fertilizer, potassium fertilizer, or phosphate-containing and potassium-containing mixed fertilizer.

10 Claims, 1 Drawing Sheet

Diagram of the device for producing nitrogen fertilizer

U.S. PATENT DOCUMENTS

| | | | |
|---|---|---|---|
| 6,218,174 B1 | 4/2001 | Keyser | |
| 7,887,615 B2 * | 2/2011 | Spindler et al. | 71/11 |
| 2005/0255019 A1 * | 11/2005 | Parrish | 423/212 |
| 2006/0188424 A1 * | 8/2006 | Kijlstra | 423/243.01 |
| 2009/0149571 A1 * | 6/2009 | Lux et al. | 523/129 |

FOREIGN PATENT DOCUMENTS

| | | |
|---|---|---|
| EP | 0 351 922 | 7/1989 |
| EP | 0 498 337 | 2/1992 |
| EP | 0 522 966 | 7/1992 |
| GB | 29752 | 0/1907 |
| GB | 111845 | 11/1918 |
| GB | 437278 | 10/1935 |
| GB | 437652 | 11/1935 |
| JP | 51142861 | 12/1976 |
| WO | WO 99/42423 | 8/1999 |

OTHER PUBLICATIONS

Database WPI Week 197704 Derwent Publications Ltd., London, GB; AN 1977-06549Y XP002408651 & JP 51 142861 A (HITACHI LTD) Dec. 7, 1976 Zusammenfassung.

Written Opinion of the International Searching Authority for related application PCT/EP2006/002744.

* cited by examiner

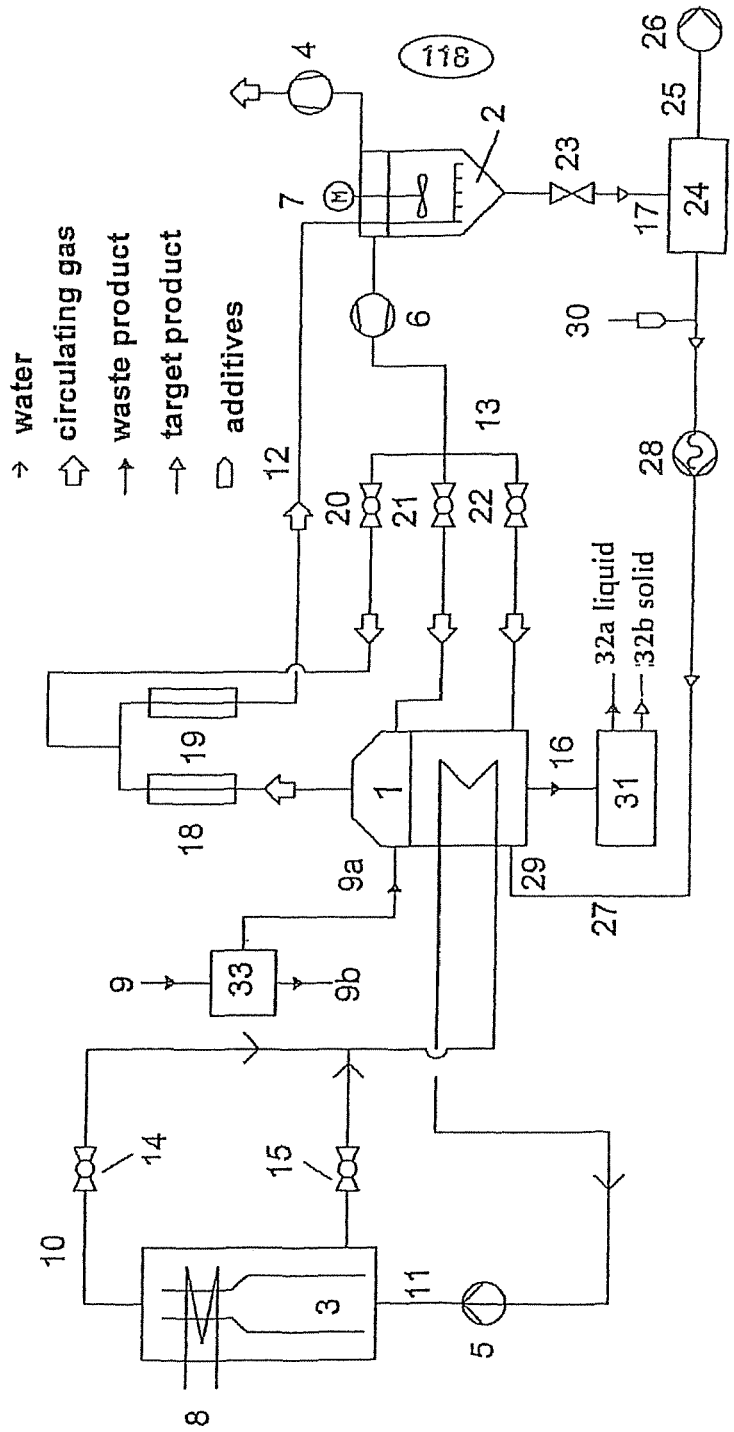
Diagram of the device for producing nitrogen fertilizer

METHOD AND DEVICE FOR PRODUCING NITROGEN FERTILIZER, REMOVING PHOSPHATE FROM ORGANIC WASTE PRODUCTS, AND LIMITING THE POTASSIUM CONCENTRATION

CROSS-REFERENCE TO RELATED APPLICATION

This application claims priority of PCT/EP2006/002744, filed Oct. 12, 2006, and German Patent Application No. DE 10 2005 017 077.3, filed Apr. 8, 2005.

The invention relates to a method and a device for producing nitrogen fertilizer from organic waste products in liquid phase, removing phosphate and limiting the potassium content, as well as for sanitizing waste and reducing emissions respectively by thermal treatment using mineral or organic additives. The waste product is heated under negative pressure to temperatures between 40° C. and 90° C.; the escaping carbon dioxide and ammonia containing gas is cooled and introduced to a mineral and aqueous suspension or brought into contact with such suspension. The nitrogen fertilizer formed in this way is removed, the excess gas that was not absorbed and contains carbon dioxide is conducted within the circuit, and the negative pressure produced by a vacuum pump at the beginning of the process is autogenously maintained by the course of the process. The non-absorbed and carbon dioxide containing excess gas is returned into the circuit by either passing it directly above the waste product to be treated via a gas cooling system or by splitting it and passing a partial stream through the waste product and passing another partial stream above the waste product.

A method is known for producing nitrogen fertilizer from organic waste products in liquid phase, for sanitizing the waste and reducing emissions by thermal treatment using mineral or organic additives in which the waste product is heated under negative pressure to temperatures between 40° C. and 90° C., the escaping carbon dioxide and ammonia containing gas is cooled and passed into an aqueous absorbing agent or brought in to contact with such absorbing agent, the nitrogen fertilizer formed in this way is removed, and the non-absorbed carbon dioxide containing excess gas is returned into the process while the negative pressure produced by a vacuum pump at the beginning of the process is autogenously maintained by the course of the process (PCT/EP 2004/013034).

The non-absorbed and carbon dioxide containing excess gas can be redirected into the circuit by passing it either
- through the waste product to be treated or
- introducing it directly above the waste product to be treated, or
- via the gas cooling system above the waste product to be treated, or
- splitting it and conducting a partial stream through the waste product and
- introducing another partial stream
above the waste product.

Many of the waste products subjected to this method, however, also contain phosphorus compounds, mostly in the form of salts of phosphoric acid (phosphates). These substances may cause harmful overfertilization when the treated waste products are applied to fields so that it is useful to separate them prior to that.

There are numerous methods that allow separation of phosphates from waste products. It is known, for example, that phosphates can be precipitated together with ammonia as the slightly soluble double compound, $MgNH_4PO_4 \cdot 6H_2O$ (struvite). The method requires adding magnesium compounds and setting precipitation conditions that have to be religiously adhered to, in particular adjustment of the pH value (DE 3732896: Process for eliminating ammonia and phosphate from waste water and process water, EP 335280: Process for the purification especially for continuous purification of wastewater containing high concentration of ammonium ion).

These methods, however, do not match the objective of the present invention.

No method is known as yet in which small quantities of phosphorus compounds are separated in addition to ammonia nitrogen in a stripping process without having to add substances that have not already been used in the nitrogen stripping process.

Likewise, no method is known in which the concentration of potassium compounds in an organic waste product can be limited to a low value. Separation of potassium is so difficult because most simple potassium compounds that are present in the form of potassium salts dissolve readily, often even very readily in water.

It is therefore the object of the invention to separate the phosphorus compounds in one process together with the ammonia nitrogen and to limit the concentration of potassium salts to a value acceptable for the further use of the effluent. The object is, first, to obtain low-nitrogen and virtually phosphorus-free effluents with a limited potassium content that can be used for agricultural and forestry applications without having to fear harm to the environment and, second, to obtain a valuable liquid nitrogen fertilizer and a phosphor-containing and optionally solid potassium-containing fertilizer as marketable products.

This object is achieved, according to the invention, by separating the fertilizer product formed in the tank in solid and liquid phase in the process according to DE 10 354 063 and 10 2004 053 297 or PCT/EP 2004/013 034, respectively,—with the target of additional phosphate fertilizer—into a solid and a liquid portion, returning all or part of the solid portion to the stripping tank and cooling the liquid waste product stripped of nitrogen and phosphorus compounds, optionally treating it with carbon dioxide containing gas and putting it then to a use as desired. If the process is part of a biogas process, it can be returned in part to a fermenter or fermenting tank.

Surprisingly, the soluble phosphates are precipitated almost completely in this way. This could not be expected because chemical precipitation of phosphates, according to the state of the art (Weiland, P.: Umweltverträgliche Gülleaufbereitung und-verwertung [Environmentally compatible preparation and utilization of manure], KTBL-Arbeitspapier 272, Darmstadt 1999) will succeed in an strongly alkaline environment only. This is why it is common to use lime milk, the sparingly water-soluble strong alkaline solution $Ca(OH)_2$ (Weiland, P.: Stand und Perspektive der Gülleaufbereitung. In: Umweltverträgliche Gülleaufbereitung und-Verwertung, KTBL-Arbeitspapier 242, Darmstadt 1997).

According to the state of the art, phosphate precipitation can only be performed after the process steps for nitrogen elimination because there is a risk of releasing considerable ammonia quantities as a result of an increase in pH value.

However the present invention relates to a method characterized in that the fertilizer product formed in the tank and present in solid and liquid phase is separated into its solid and liquid portion for phosphate removal, that the solid portion is completely or partially returned to the stripping tank, and the liquid waste product stripped of nitrogen and phosphorus compounds is cooled and optionally treated with carbon dioxide containing gas and used as desired.

According to the invention, the lime fertilizer obtained in the process that basically is calcium carbonate, $CaCO_3$, i.e. a neutral reacting substance that is virtually insoluble in water and even more so in slightly alkaline effluents, is primarily used as a precipitating agent. Since calcium carbonate is extremely hard to dissolve, we did not expect that it could be used to precipitate phosphates, some which are even somewhat more readily water-soluble.

It was also unexpectedly found that the entire or partial return of the lime fertilizer as one of the main products to the stripping tank even increases the effect of ammonia stripping.

Another improvement and useful aspect of ammonia stripping can be achieved by adding a small quantity of an alkaline mineral meal such as quicklime to the returned product, the lime fertilizer, for which just 0.01 to 0.5 percent in relation to the weight of the waste product to be treated are sufficient. This individual step of the method is also characterized in that 0.01 to 0.5 percent by weight of a basic mineral meal is added to the product returned to the stripping tank.

While it is possible to add a greater quantity of the mineral meal, this will change the course of the stripping process and should be avoided.

In the improvement according to the invention, a relatively simple measure is taken to not only virtually separate all—phosphate—phosphorus in addition to separating ammonia nitrogen from the waste product and convert it into lime fertilizer but also to increase the degree of ammonia separation. The phosphate content is reduced to <10% of the initial value using the method according to the invention, which corresponds to a precipitation degree of $\geq 90\%$. It is preferred to achieve a phosphate concentration of $\leq 8\%$ of the input value, corresponding to a precipitation degree of $\geq 92\%$. A phosphate concentration of <6%, corresponding to a precipitation degree of $\geq 94\%$, is most preferred.

Another unexpected effect occurred in effluents with increased potassium content of more than 1 percent by weight per liter. It turned out that—with simultaneous presence of sulfate. If a sulfate—the precipitated solid product contains significant potassium quantities containing compound, e.g. in the form of gypsum, is added to the returned lime fertilizer (the complete or partial solid portion returned to the stripping tank), the potassium concentration in the liquid effluent can be limited to $\geq 1$ weight-%. This application is described in more detail in Example 4.

This individual step of the method is characterized in that at least one sulfate containing compound is added to the solid portion returned completely or partially to the stripping tank to limit the potassium content.

The sulfate containing compound is added in such a way that the mole ratio of calcium in the at least one sulfate containing compound to potassium in the waste product is in the range from 0.5 to 3.

In other words, the invention relates to a method characterized in that the at least one sulfate containing compound is added in such a way that the mole ratio of calcium in the at least one sulfate containing compound to potassium in the waste product is in the range from 0.5 to 3.

The sulfate containing compound is preferably added in such a way that the mole ratio of calcium in the at least one sulfate containing compound to potassium in the waste product is in the range from 1 to 2.

This highlighted special case of the method is also characterized in that the at least one sulfate containing compound is added in such a way that the mole ratio of calcium in the at least one sulfate containing compound to potassium in the waste product is in the range from 1 to 2.

While the degree of separation of the potassium rises with the Ca/K mole ratio, this rise becomes slower when the ratio becomes greater so that a ratio of Ca/K>3 does no longer bring any improvement.

The proven simple solution for selecting at least one sulfate containing compound is to use gypsum.

A preferred embodiment of the method is characterized in that the at least one sulfate containing compound is gypsum.

The last solid portions precipitated by the method according to the invention to which organic constituents can still adhere will make an excellent mixed fertilizer. Another characteristic of the invention is the use of the last solid portion obtained in the stripping process as phosphate fertilizer, potassium fertilizer, or mixed potassium and phosphate fertilizer and phosphate and/or potassium containing fertilizer respectively.

The method for limiting the potassium content in liquid waste products does not depend on a previous stripping process but may also be performed on effluents where reducing the nitrogen and/or phosphate concentration is of little or no interest. In this special case, the process does not have to be performed as a cycle, and no negative pressure has to be applied. The application that results in a precipitate enriched with potassium is described in greater detail in Example 5.

In a special embodiment of the method, the measures to limit the potassium content can be performed on any liquid waste product even without a previous stripping process or after such process.

Phosphate separation can be improved by separating the effluent introduced into the stripping tank, which partially can have a very high viscosity, into a low-viscous portion and a portion rich in solids by reducing the solid portion prior to treatment. It is useful for improving the effect according to the invention if the low-viscous portion has a dynamic viscosity of less than 20 mPa s.

This individual step of the method is thus characterized in that the viscosity of the liquid waste product is reduced prior to treatment by reducing its solid content.

If the liquid waste product of the invention is raw or fermented manure, its dynamic viscosity can be up to 40 to 350 mPa s at room temperature. The liquid waste product can be separated into a low-viscous portion and a portion rich in solids with little technical effort using commercial separators such as sieve bends, pressure worms, or centrifuges. The viscosity of the low-viscous product can easily be reduced to 2 to 7 mPa s; for the effect according to the invention a viscosity of <20 mPa s is adequate. Depending on the separation method used and the properties of the raw products, 5 to 20 percent by volume of the product used remain in the solid portion, the viscosity of which typically exceeds the measuring ranges of common viscosimeters.

This individual step of the method is thus characterized in that the viscosity of the liquid waste products is reduced by separating the solid portions to <20 mPa s.

The portion rich in solids can be processed to become compost or put to another use.

Another useful embodiment of the method provides that the solids contained in the stripped and slightly alkaline effluent are separated, that the remaining liquid product is treated with carbon dioxide containing gas until a pH value of <8 is reached afterwards and a desired portion of the effluent treated in this way is returned to the fermentation process.

Thus another individual step of the method is characterized in that the solids contained in the stripped and slightly alkaline effluent are separated, that the remaining liquid product is treated with carbon dioxide containing gas until a pH value of <8 is reached and afterward a desired portion of the effluent treated in this way is returned to the fermentation process.

The stripped effluent from the stripping tank is passed through another separator and separated into a low-viscous portion and a last solid portion rich in phosphate that can be used directly as phosphorous fertilizer. The slightly potassium containing liquid portion that still has fertilizing properties can be directly applied to the fields. It has also been proven useful to return a portion of it to the fermenter if the device of the invention is a biogas plant. This unexpectedly improves the decomposition of the fermenting substrate, which in turn reduces the viscosity of the effluent from the biogas tank and accelerates the downstream stripping process.

The invention is not limited in application to organic waste such as biogas manure but can be used for separating the phosphate load from other ammonia and phosphate containing waste products or waste products with a higher potassium concentration, such as municipal sewage. This application is useful because it eliminates the need to use strong alkaline solutions and expensive chemical precipitating agents and coagulants.

The device for producing nitrogen fertilizer primarily consists of the following components: stripping tank for heating under negative pressure, receiver tank for reactions in heterogeneous phase, heat accumulator for heat exchange, vacuum pump, heating water pump, circulation fan and stirrer and an additional gas cooling system with ascending separating column and descending cooler, as well as additional pipelines and ball valves that allow optional introduction of the circulating gas at various places; according to the invention, the device includes additional devices for separating the liquid and solid fertilizer products upstream and downstream of the stripping tank and for the return of the treated waste product to the fermenter (if there is an upstream biogas plant) or the solid fertilizer product from the receiver tank to the stripping tank, as well as a device for adding other additives.

According to the invention, the device according to PCT/EP 2004/013 034 is completed by a precipitation tank (separator 24). The aqueous ammonium sulfate solution is discharged via the outlet (25) that is connected to a pump (26).

The sludgy product obtained after pumping off the ammonium sulfate solution is completely or partially conducted via pipeline (27) or another conveyor through the pump (28) at the inlet of the phosphate incorporation (29) into the stripping tank (1).

Optionally, an alkaline additive can be added via the inlet (30). It is most useful to combine or suspend this additive with a partial quantity of the waste product to be subjected to the next stripping run.

After this stripping run, the treated waste product is discharged into another separator (31) and the solids are separated from the liquid phase in a conventional process via outlets (32a, b).

A third separator (33) is used—if required—for separating the waste product to be fed into the stripping tank (1) into a low-viscous portion conducted via inlet (9a) into (1) and a high-viscous portion discharged via (9b).

FIG. 1 is an example of a diagrammatic view of the entire device for producing nitrogen fertilizer (1 to 23) with additional components for phosphate removal and potassium limitation (24 to 33).

Wherein:
1 Stripping tank for heating under negative pressure
2 Receiver tank for reaction in heterogeneous phase
3 Heat accumulator for heat exchange
4 Vacuum pump
5 Heating water pump
6 Circulation fan
7 Stirrer
8 Heat exchanger
9 Effluent incorporation.
9a Effluent, low-viscous
9b Effluent, high-viscous
10 Heating water outlet
11 Heating water return line
12 Stripping gas line
13 Return gas line
14 Ball valve
15 Ball valve
16 Residue outlet
17 Nitrogen fertilizer outlet
18 Ascending part of the cooling system (separating column)
19 Descending part of the cooling system (cooler)
20-22 Ball valves for return gas
23 Stop valve
24 Separator
25 Outlet for ammonium sulfate solution
26 Pump
27 Return line
28 Pump
29 Inlet for phosphate incorporation and for limiting the potassium content respectively
30 Inlet for additives
31 Separator
32a Outlet, liquid product
32b Outlet, solid product
33 Separator, if required The device for producing nitrogen fertilizer, for phosphate removal and/or limiting the potassium content thus consists of the major components stripping tank (1) for heating under negative pressure, receiver tank for reaction in heterogeneous phase (2), heat accumulator for heat exchange (3), heating water pump (5), circulation fan (6) and stirrer (7) with an additional gas cooling system featuring an ascending separating column (18) and descending cooler (19) as well as additional pipelines and ball valves that allow optional introduction of the circulating gas at various places, characterized in that said device includes additional devices (24) (31) and, optionally, (33) for separating the liquid and solid fertilizer products upstream and downstream of the stripping tank (1) and for returning the treated waste product to the fermenter (if there is an upstream biogas plant) or the solid fertilizer product from the receiver tank to the stripping tank, as well as a device for adding other additives (30).

The invention is explained in greater detail with reference to the examples below, to which however it is not limited:

EXAMPLE 1

Comparative Example

The stripping process is performed as described in DE 103 54 063 or PCT/EP 2004/013034, respectively. 250 l of effluent manure with an ammonium content of 4.8 g/l, i.e. a total of 1.2 kg, are fed into the stripping tank (1) and subjected to the stripping process. An aqueous suspension of FGD gypsum with a content of pure calcium sulfate, $CaSO_4$, of 3.5 kg is fed into the receiver tank (2). In the stripping process, 850 g of ammonia corresponding to a quantity of 900 g of ammonium are stripped off and reacted with the gypsum to 3.3 kg ammonium sulfate and 2.5 kg lime fertilizer, calculated in relation to calcium carbonate, $CaCO_3$. This represents a stripping degree of 75% of the ammonium nitrogen fed into the tank (1).

In addition, the receiver tank (2) contains 10 kg water resulting in total from the condensate passed over from the stripping process, the slurrying fluid for the gypsum and the water of crystallization of the gypsum. The phosphate concentration of the lime fertilizer is below the detection limit. The effluent manure used in the process contained 545 mg/l of phosphate. The phosphorus content slightly rose to 555 mg/l in the stripping process because of reconcentration due to water discharge.

EXAMPLE 2

The stripping process is performed as in Example 1 but the lime fertilizer accumulated in the receiver tank (2) in the previous batch process was returned to the stripping tank (1). The FGD gypsum suspension fed into the receiver tank contains 3.8 kg $CaSO_4$, that react to 2.7 kg lime fertilizer, calculated as $CaCO_3$. 3.5 kg of ammonium sulfate in aqueous solution accumulate in the receiver tank, which corresponds to a stripping degree of 80%.

The fertilizer mixture formed is discharged via the outlet (23) into the precipitation tank (separator 24). After a short settling time, the solid lime fertilizer has separated from the aqueous ammonium sulfate solution which is discharged via outlet (25) into common containers. A small quantity of the waste product to be treated in the next stripping run, e.g. fully fermented biogas manure, is added via inlet (30) to the lime fertilizer to slurry it into a pumpable sludge that is then fed into the tank (1) via line (27) using the pump (28). After the next stripping run, the mineral additive described above is separated in a known way together with the precipitated phosphate from the treated liquid product.

The phosphate concentration of the manure in (1) has decreased to 40 mg/l, which represents a precipitation degree of 92%. The separated phosphate is completely contained in the lime fertilizer separated from the treated effluent manure.

EXAMPLE 3

The stripping process is performed as in Example 2, only that 0.5 kg of quicklime were added to the lime fertilizer precipitated in the precipitation tank (separator 24) with the slurrying process and were returned into the tank (1) via pipeline (27) as described above.

280 l of an effluent manure from a biogas plant with a dynamic viscosity of 95 mPa s at 20° C. were used as waste product and 250 l of a low-viscous manure with a viscosity of 7 mPa s were obtained using separator (33) and conducted into the stripping tank (1) via the discharge pipe 9a. This measure reduced the stripping process from 3 to 2 hours.

The separated solid portion was provided for composting.

The prestorage tank (1) was charged with 3.9 kg of FGD gypsum, calculated in relation to pure $CaSO_4$. The yield was 2.8 kg lime fertilizer, calculated in relation to $CaCO_3$ and 3.7 kg ammonium sulfate in aqueous solution, which represents a stripping degree of 84%.

The phosphate content of the manure in (1) has decreased to 35 mg/l, which represents a precipitation degree of 94%. The separated phosphate is completely contained in the lime fertilizer returned from the treated effluent manure.

EXAMPLE 4

The stripping process is performed as in Example 2 with 250 l of effluent, only that 10 kg of calcium sulfate, calculated as $CaSO_4$, are added to the lime fertilizer precipitated in the precipitation tank (24) in the form of FGD gypsum and then returned to tank (1) via the pipeline (27) described above. The effluent manure used contained 945 mg/l of phosphate and 23 g/l of potassium. The Ca/K mole ratio calculated in relation to the FGD gypsum added was 0.5.

The treatment described decreased the phosphate content by 95% to 47 mg/l of effluent, the potassium content decreased to 16 g/l. The differential quantities are contained in the solid precipitate.

EXAMPLE 5

As in the examples above, 250 l of a liquid waste product containing 20 g potassium per liter were used. 20 kg of calcium sulfate, calculated as $CaSO_4$, were added to this effluent in the form of FGD gypsum at room temperature and standard pressure in a common stirring apparatus. The Ca/K mole ratio was 1.1. A crystallizate was precipitated after a short time that weighed 30 kg after drying at 105° C. and contained 6.7 percent by weight of potassium. The effluent separated from the solid had a residual potassium concentration of 11.9 g per liter.

The invention claimed is:

1. A method for producing nitrogen fertilizer from organic waste products in liquid phase, for removing phosphate and sanitizing the waste and reducing emissions by thermal treatment using mineral or organic additives where the waste product is heated in a stripping tank under negative pressure to temperatures between 40° C. and 90° C., the escaping carbon dioxide and ammonia containing gas is cooled and introduced into a mineral-aqueous suspension and/or brought into contact with such suspension respectively, the nitrogen fertilizer formed in this way is removed and the non-absorbed carbon dioxide containing excess gas is conducted within the circuit and the negative pressure generated by a vacuum pump at the beginning of the process is maintained autogenously and the non-absorbed carbon dioxide containing excess gas is returned into the circuit by either conducting it directly above the waste product to be treated via a gas cooling system or by splitting it and conducting a partial stream through the waste product and introducing another partial stream above the waste product, characterized in that for phosphate removal, the fertilizer product formed in the receiver tank and present in a solid and a liquid phase is separated into a liquid and a solid portion, wherein the solid portion is completely or partially returned to the stripping tank and the liquid waste product stripped of nitrogen and phosphorus compounds is cooled and further wherein at least one sulfate containing compound is added to the solid portion that is completely or partially returned to the stripping tank, in order to limit the potassium content and the precipitate obtained in this process is separated from the liquid portion.

2. The method according to claim 1, characterized in that the viscosity of the liquid waste product is lowered by reducing the solids content prior to thermal treatment.

3. The method according to claim 2, characterized in that the viscosity of the liquid waste product is lowered by separating solids to <20 mPa s.

4. The method according to claim 1, characterized in that 0.01 to 0.5 percent by weight of a basic mineral meal is added to the product returned to the stripping tank.

5. The method according to claim 1, characterized in that the at least one sulfate containing compound is added in such a way that the mole ratio of the calcium in the at least one sulfate containing compound to potassium in the waste product is in the range from 1 to 2.

6. The method according to claim 1, characterized in that the sulfate containing compound is gypsum.

7. The method according to claim 1, characterized in that the measures to limit the potassium content are performed on any liquid waste product without an upstream stripping process or after such process.

8. The method according to claim 1, characterized in that the liquid waste product stripped of nitrogen and phosphorus compounds is treated with carbon dioxide containing gas.

9. The method according to claim 1, characterized in that the solids contained in the stripped and slightly alkaline effluent are separated, that the remaining liquid product is treated with carbon dioxide containing gas until a pH value of <8 is reached and a desired portion of the effluent treated in this way is returned to the fermentation process.

10. The method according to claim 1 comprising using the solid portion as phosphate fertilizer, potassium fertilizer, or mixed potassium and phosphate fertilizer and phosphate and/or potassium containing fertilizer respectively.

* * * * *